(12) United States Patent
Dorum

(10) Patent No.: US 11,443,465 B2
(45) Date of Patent: Sep. 13, 2022

(54) METHOD, APPARATUS, AND COMPUTER PROGRAM PRODUCT FOR GENERATING TURN PATHS THROUGH AN INTERSECTION

(71) Applicant: HERE Global, B.V., Eindhoven (NL)

(72) Inventor: Ole Henry Dorum, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 280 days.

(21) Appl. No.: 16/827,886

(22) Filed: Mar. 24, 2020

(65) Prior Publication Data
US 2021/0304462 A1 Sep. 30, 2021

(51) Int. Cl.
*G06T 11/20* (2006.01)
*G01C 21/32* (2006.01)
*G05D 1/02* (2020.01)

(52) U.S. Cl.
CPC ............ *G06T 11/203* (2013.01); *G01C 21/32* (2013.01); *G05D 1/0212* (2013.01); *G05D 1/0274* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 7,084,882 B1 * | 8/2006 | Dorum | G06T 11/203 345/592 |
| 7,797,104 B2 | 9/2010 | Finn et al. | |
| 9,273,976 B2 | 3/2016 | Davidson | |
| 9,285,805 B1 * | 3/2016 | Pollock | G06V 20/56 |
| 9,672,759 B2 | 6/2017 | Hofmann et al. | |
| 9,857,191 B2 | 1/2018 | Mason et al. | |
| 9,978,161 B2 | 5/2018 | Dorum | |
| 10,001,378 B2 | 6/2018 | Mund | |
| 10,096,248 B2 | 10/2018 | Penna et al. | |

(Continued)

FOREIGN PATENT DOCUMENTS

| | | |
|---|---|---|
| CN | 108 053 679 A | 5/2018 |
| EP | 3 104 120 A1 | 12/2016 |

OTHER PUBLICATIONS

Extended European Search Report for European Application No. 21164222.8 dated Jul. 29, 2021, 9 pages.

(Continued)

*Primary Examiner* — Ryan M Gray
(74) *Attorney, Agent, or Firm* — Peter H. Yu; HERE Technologies

(57) ABSTRACT

A method is provided for gathering probe data and using the gathered data to create map intersection turn paths. Methods may include: receiving probe data from a plurality of probes passing through an intersection; identifying a turn maneuver of the intersection including an incoming road link and an outgoing road link; generating a curve of the turn maneuver based on a geometry of the intersection and a scaling factor; filtering the probe data based on the generated curve to obtain remaining probe data; fitting a spline to the remaining probe data to generate a turn path representative of the turn maneuver; and providing for guidance of a vehicle based on the spline of the turn path. Embodiments including apparatuses and computer program products for creating map intersection turn paths are also provided.

18 Claims, 11 Drawing Sheets

(56) References Cited

U.S. PATENT DOCUMENTS

| | | | |
|---|---|---|---|
| 10,272,947 B2* | 4/2019 | Park | B60W 30/18163 |
| 10,352,718 B2 | 7/2019 | Wu et al. | |
| 10,444,020 B2 | 10/2019 | Dorum | |
| 10,546,400 B2 | 1/2020 | Dorum | |
| 10,829,121 B1* | 11/2020 | Allan | B60W 30/18163 |
| 2009/0306881 A1 | 12/2009 | Dolgov et al. | |
| 2010/0082248 A1* | 4/2010 | Dorum | G06T 15/20 |
| | | | 701/533 |
| 2013/0144525 A1 | 6/2013 | Yang | |
| 2014/0236482 A1* | 8/2014 | Dorum | G01C 21/34 |
| | | | 701/400 |
| 2016/0364985 A1 | 12/2016 | Penna et al. | |
| 2017/0213466 A1* | 7/2017 | Azar | G05D 1/0088 |
| 2017/0294036 A1 | 10/2017 | Dorum | |
| 2019/0302801 A1* | 10/2019 | Zlot | G05D 1/0289 |
| 2020/0132476 A1* | 4/2020 | Roeth | G06V 20/588 |
| 2020/0192384 A1* | 6/2020 | Nakanishi | G08G 1/165 |
| 2021/0302968 A1* | 9/2021 | Dorum | G01C 21/3841 |

OTHER PUBLICATIONS

Agamennoni, G. et al. *Robust Inference of Principal Road Paths for Intelligent Transportation Systems*, IEEE Transactions on Intelligent Transportation Systems, vol. 12, No. 1 (Mar. 2011) 298-308.

Agamennoni, G. et al., *Technical Report: Inference of Principal Road Paths Using GPS Data*, The University of Sydney, Australian Center for Field Robotics: Sydney, Australia, 2010(Jun. 4, 2010) 1-23.

Biagioni, J. et al., *Inferring Road Maps From Global Positioning System Traces: Survey and Comparative Evaluation*, Department of Computer Science, University of Illinois at Chicago (Nov. 2011) 21 pages.

Deng, M. et al., *Generating Urban Road Intersection Models From Low-Frequency GPS Trajectory Data*, International Journal of Geographical Information Science, vol. 32, No. 12 (2018) 2337-2361.

Zheng, L. et al., *A High-Definition Road-Network Model for Self-Driving Vehicles*, International Journal of Geo-Information, 7, 417 (2018) 14 pages.

U.S. Appl. No. 16/827,945, filed Mar. 24, 2020, In re: Dorum et al., entitled *Method, Apparatus, and Computer Program Product for Generating Turn Paths Through an Intersection*.

U.S. Appl. No. 16/827,968, filed Mar. 24, 2020, In re: Dorum, entitled *Method, Apparatus and Computer Program Product for Generating Parking Lot Geometry*.

U.S. Appl. No. 16/827,975, filed Mar. 24, 2020, In re: Dorum, entitled *Method, Apparatus, and Computer Program Product for Generating a Map of Road Links of a Parking Lot*.

Extended European Search Report for European Application No. 21163913.3 dated Aug. 27, 2021, 8 pages.

Gao et al., "VeMap: Indoor Road Map Construction via Smartphone-based Vehicle Tracking", 2016 IEEE Global Communications Conference (GLOBECOM), (Dec. 4-8, 2016), 6 pages.

\* cited by examiner

METHOD, APPARATUS, AND COMPUTER PROGRAM PRODUCT FOR GENERATING TURN PATHS THROUGH AN INTERSECTION

TECHNOLOGICAL FIELD

An example embodiment of the present disclosure relates to creating map intersection turn paths, and more particularly, for automatically creating two- or three-dimensional intersection turn path spline curves from probe sources.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. Digital maps can further be enhanced with dynamic information, such as traffic information in real time along roads and through intersections.

Autonomous and semi-autonomous vehicle control requires detailed information relating to roads along which vehicles will travel. Straight sections of road are considerably less complex than intersections of roads where numerous paths are available. Autonomous and semi-autonomous vehicle control requires awareness of all available paths to successfully and efficiently navigate through a region.

BRIEF SUMMARY

A method, apparatus, and computer program product are provided in accordance with an example embodiment for creating map intersection turn paths, and more particularly, for automatically creating two- or three-dimensional intersection turn path spline curves from probe sources. Embodiments provided herein include an apparatus having at least one processor and at least one memory including computer program code with the at least one memory and computer program code being configured to, with the processor, cause the apparatus to: receive probe data from a plurality of probes passing through an intersection; identify a turn maneuver of the intersection including an incoming road link and an outgoing road link; generate a curve of the turn maneuver based on a geometry of the intersection and a scaling factor; filter the probe data based on the generated curve to obtain remaining probe data; fit a spline to the remaining probe data to generate a turn path representative of the turn maneuver; and provide for guidance of a vehicle based on the spline of the turn path.

According to an example embodiment, the curve includes a cubic Bézier curve, where causing the apparatus to generate a cubic Bézier curve of the turn maneuver based on a geometry of the intersection and a scaling factor includes causing the apparatus to: establish a first vertex of a control polygon of the cubic Bézier curve at a point along the incoming road link; establish a second vertex of the control polygon of the cubic Bézier curve at a point along the outgoing road link; identify an approximate intersection center; establish a third vertex of the control polygon of the cubic Bézier curve at a point along a vector from the first vertex to the approximate intersection center based on the scaling factor; and establish a fourth vertex of the control polygon of the cubic Bézier curve at a point along a vector from the second vertex to the approximate intersection center based on the scaling factor. Causing the apparatus to filter the probe data based on the generated curve to obtain remaining probe data may include causing the apparatus to map-match probe data to the curve based on a placement and shape of the curve, where the map-matched probe data is the remaining probe data.

Causing the apparatus to provide for guidance of the vehicle based on the spline of the turn path may include causing the apparatus to provide autonomous vehicle control through the intersection following the spline of the turn path. Causing the apparatus to fit a spline to the remaining probe data representative of the turn maneuver may include causing the apparatus to create a knot vector for the spline where a parametric distance between each knot is inversely proportional to a curvature of the curve. Causing the apparatus to fit a spline to the remaining probe data to generate a path representative of the turn maneuver may include causing the apparatus to assign a parametric B-spline value to each point of remaining probe data based on a projected arc-length location along the curve, where each point of remaining probe data is projected onto the curve. Causing the apparatus to fit a spline to the remaining probe data to generate a turn path representative of the turn maneuver may optionally include causing the apparatus to reduce a change of curvature using a regularization function to smooth a curvature of the spline with a regularization factor.

Embodiments provided herein may include a computer program product having at least one non-transitory computer-readable storage medium having computer-executable program code instructions stored therein with the computer-executable program code instructions including program code instructions to: receive probe data from a plurality of probes passing through an intersection; identify a turn maneuver of the intersection including an incoming road link and an outgoing road link; generate a curve of the turn maneuver based on a geometry of the intersection and a scaling factor; filter the probe data based on the generated curve to obtain remaining probe data; fit a spline to the remaining probe data to generate a turn path representative of the turn maneuver; and provide for guidance of a vehicle based on the spline of the turn path.

According to an example embodiment, the curve includes a cubic Bézier curve, where the program code instructions to generate a cubic Bézier curve of the turn maneuver based on a geometry of the intersection and a scaling factor may include program code instructions to: establish a vertex of a control polygon of the cubic Bézier curve at a point along the incoming road link; establish a second vertex of the control polygon of the cubic Bézier curve at a point along the outgoing road link; identify an approximate intersection center; establish a third vertex of the control polygon of the cubic Bézier curve at a point along a vector from the first vertex to the approximate intersection center based on the scaling factor; and establish a fourth vertex of the control polygon of the cubic Bézier curve at a point along a vector from the second vertex to the approximate intersection center based on the scaling factor. The program code instructions to filter the probe data based on the generated curve to obtain remaining probe data may include program code instructions to map-match probe data to the curve based on a placement and shape of the curve, where the map-matched probe data is the remaining probe data.

According to an example embodiment, the program code instructions to provide for guidance of the vehicle based on the spline of the turn path may include program code instructions to provide autonomous vehicle control through the intersection following the spline of the turn path. The program code instructions to fit a spline to the remaining probe data to generate a turn path representative of the turn maneuver may include program code instructions to create a knot vector for the spline where a parametric distance between each knot is inversely proportional to a curvature of the curve. The program code instructions to fit a spline to the remaining probe data to generate a turn path representative of the turn maneuver may optionally include program code instructions to assign a parametric B-spline value to each point of remaining probe data based on a projected arc-length location along the curve, where each point of remaining probe data is projected onto the curve. The program code instructions to fit a spline to the remaining probe data to generate a turn path representative of the turn maneuver may optionally include program code instructions to reduce a change of curvature using a regularization function to smooth a curvature of the spline with a regularization factor.

Embodiments provided herein may include a method including: receiving probe data from a plurality of probes passing through an intersection; identifying a turn maneuver of the intersection including an incoming road link and an outgoing road link; generating a curve of the turn maneuver based on a geometry of the intersection and a scaling factor; filtering the probe data based on the generated curve to obtain remaining probe data; fitting a spline to the remaining probe data to generate a turn path representative of the turn maneuver; and providing for guidance of a vehicle based on the spline of the turn path.

According to an example embodiment, the curve is a cubic Bézier curve, where generating a cubic Bézier curve of the turn maneuver based on a geometry of the intersection and a scaling factor includes: establishing a vertex of a control polygon of the cubic Bézier curve at a point along the incoming road link; establishing a second vertex of the control polygon of the cubic Bézier curve at a point along the outgoing road link; identifying an approximate intersection center; establishing a third vertex of the control polygon of the cubic Bézier curve at a point along a vector from the first vertex to the approximate intersection center based on the scaling factor; and establishing a fourth vertex of the control polygon of the cubic Bézier curve at a point along a vector from the second vertex to the approximate intersection center based on the scaling factor. Filtering the probe data based on the generated curve to obtain remaining probe data may include map-matching probe data to the curve based on a placement and shape of the curve, where the map-matched probe data is the remaining probe data.

According to an example embodiment, providing for guidance of the vehicle based on the spline of the turn path may include providing autonomous vehicle control through the intersection following the spline of the turn path. Fitting a spline to the remaining probe data to generate a turn path representative of the turn maneuver may include creating a knot vector for the spline where a parametric distance between each knot is inversely proportional to a curvature of the curve. Fitting a spline to the remaining probe data to generate a turn path representative of the turn maneuver may optionally include assigning a parametric B-spline value to each point of remaining probe data based on a projected arc-length location along the curve, where each point of remaining probe data is projected onto the curve.

Embodiments provided herein may include an apparatus including: means, such as a processor, a communications interface, or the like, for receiving probe data from a plurality of probes passing through an intersection; means, such as a processor or the like, for identifying a turn maneuver of the intersection including an incoming road link and an outgoing road link; means, such as a processor or the like, for generating a curve of the turn maneuver based on a geometry of the intersection and a scaling factor; means, such as a processor or the like, for filtering the probe data based on the generated curve to obtain remaining probe data; means, such as a processor, a user interface, or the like, for fitting a spline to the remaining probe data to generate a turn path representative of the turn maneuver; and means for providing for guidance of a vehicle based on the spline of the turn path.

According to an example embodiment, the curve is a cubic Bézier curve, where the means for generating a cubic Bézier curve of the turn maneuver based on a geometry of the intersection and a scaling factor includes: means, such as a processor or the like, for establishing a vertex of a control polygon of the cubic Bézier curve at a point along the incoming road link; means, such as a processor or the like, for establishing a second vertex of the control polygon of the cubic Bézier curve at a point along the outgoing road link; means, such as a processor or the like, for identifying an approximate intersection center; means for establishing a third vertex of the control polygon of the cubic Bézier curve at a point along a vector from the first vertex to the approximate intersection center based on the scaling factor; and means, such as a processor or the like, for establishing a fourth vertex of the control polygon of the cubic Bézier curve at a point along a vector from the second vertex to the approximate intersection center based on the scaling factor. The means for filtering the probe data based on the generated curve to obtain remaining probe data may include means, such as a processor or the like, for map-matching probe data to the curve based on a placement and shape of the curve, where the map-matched probe data is the remaining probe data.

According to an example embodiment, the means for providing for guidance of the vehicle based on the spline of the turn path may include means, such as a processor or the like, for providing autonomous vehicle control through the intersection following the spline of the turn path. The means for fitting a spline to the remaining probe data to generate a turn path representative of the turn maneuver may include means, such as a processor or the like, for creating a knot vector for the spline where a parametric distance between each knot is inversely proportional to a curvature of the curve. The means for fitting a spline to the remaining probe data to generate a turn path representative of the turn maneuver may optionally include means, such as a processor or the like, for assigning a parametric B-spline value to each point of remaining probe data based on a projected arc-length location along the curve, where each point of remaining probe data is projected onto the curve.

BRIEF DESCRIPTION OF THE DRAWINGS

Figure 1:
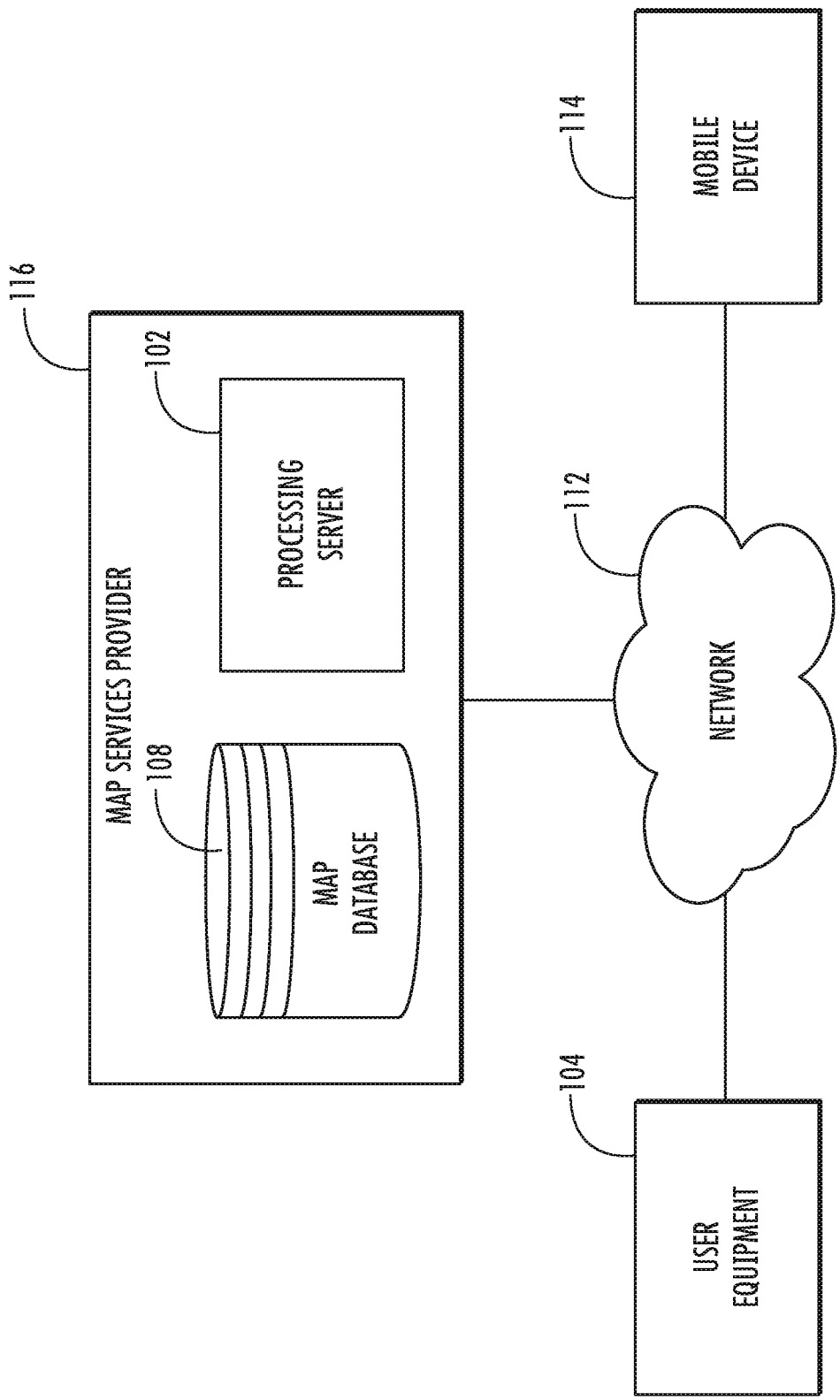
Figure 2:
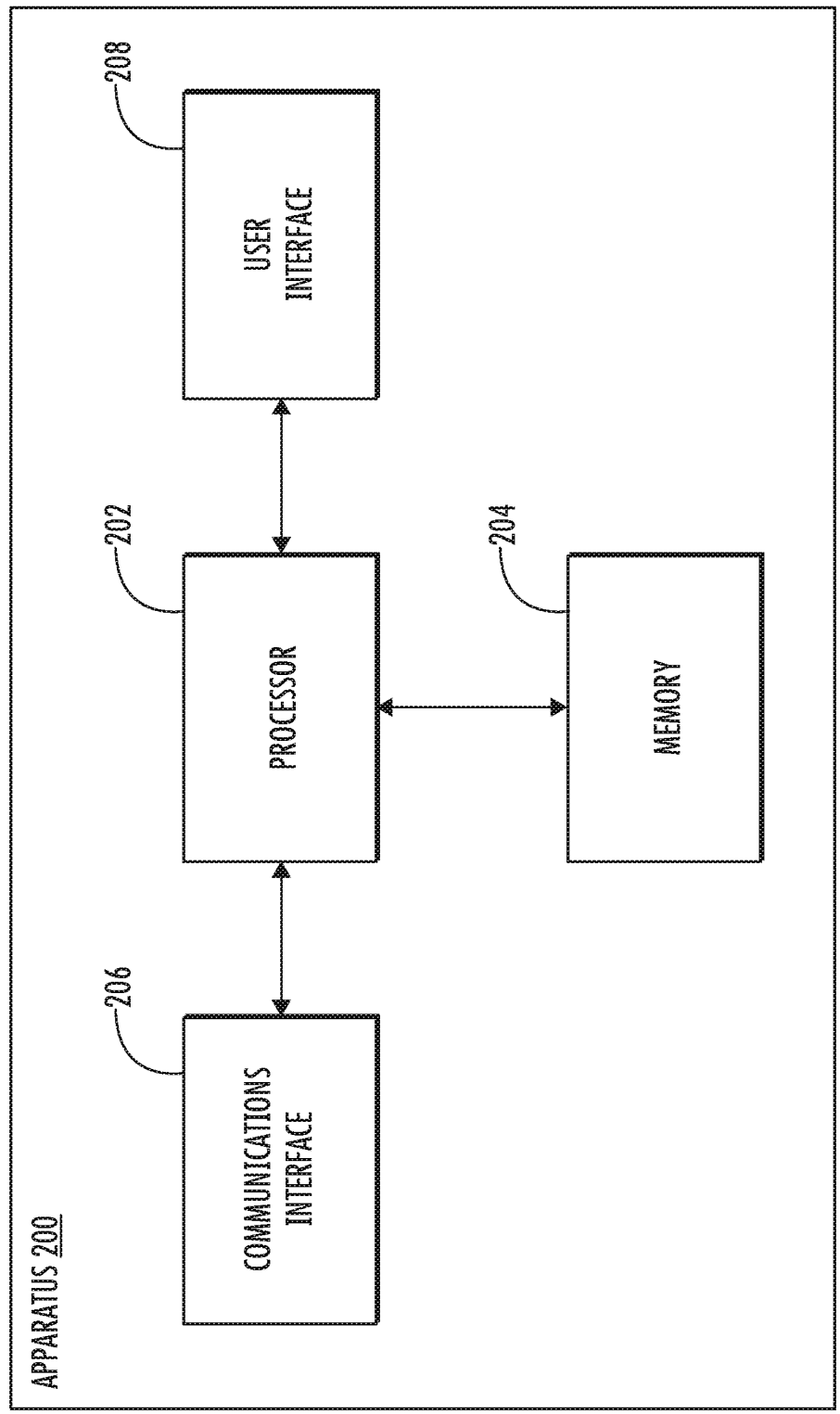
Figure 3:
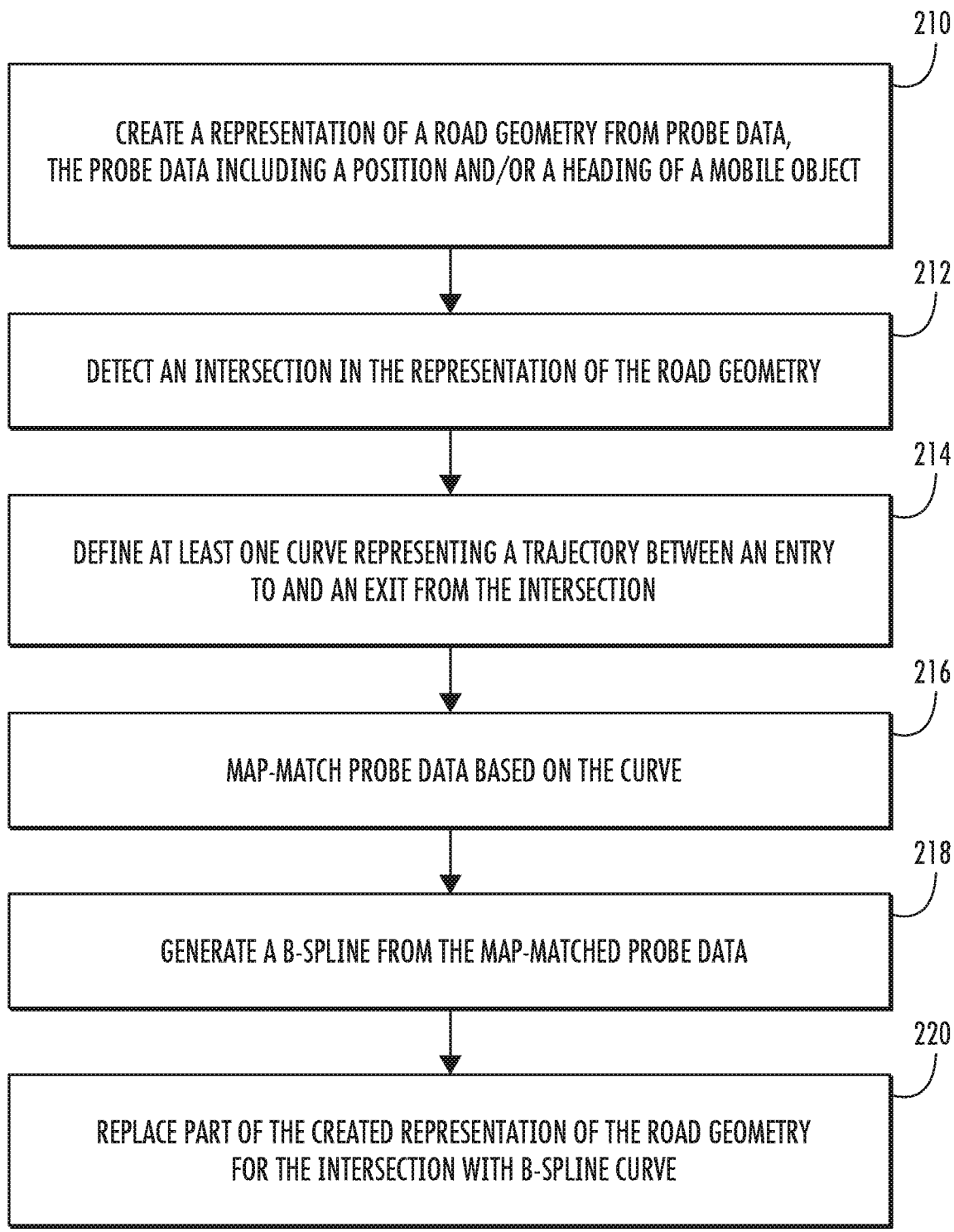
Figure 4:
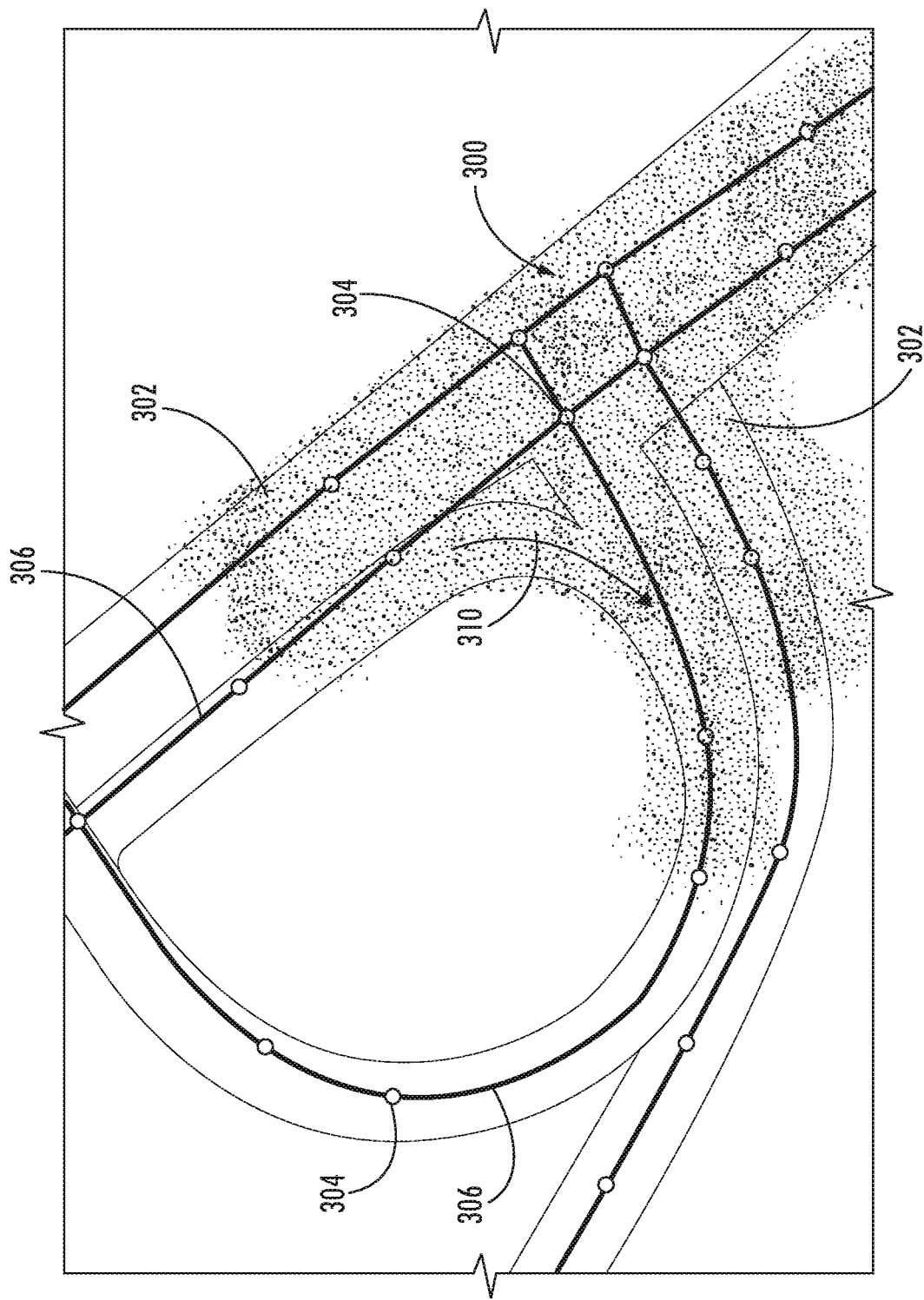
Figure 5:
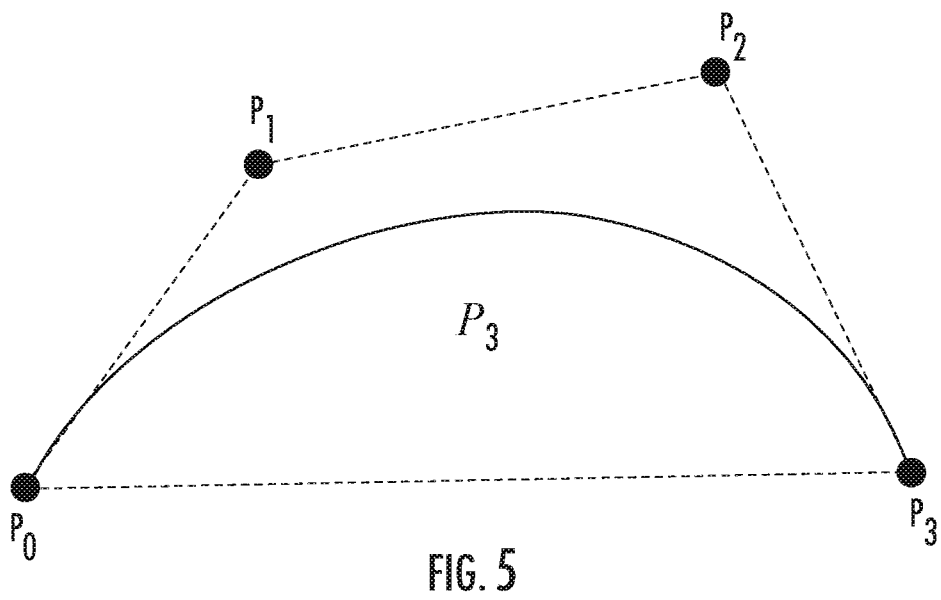
Figure 6:
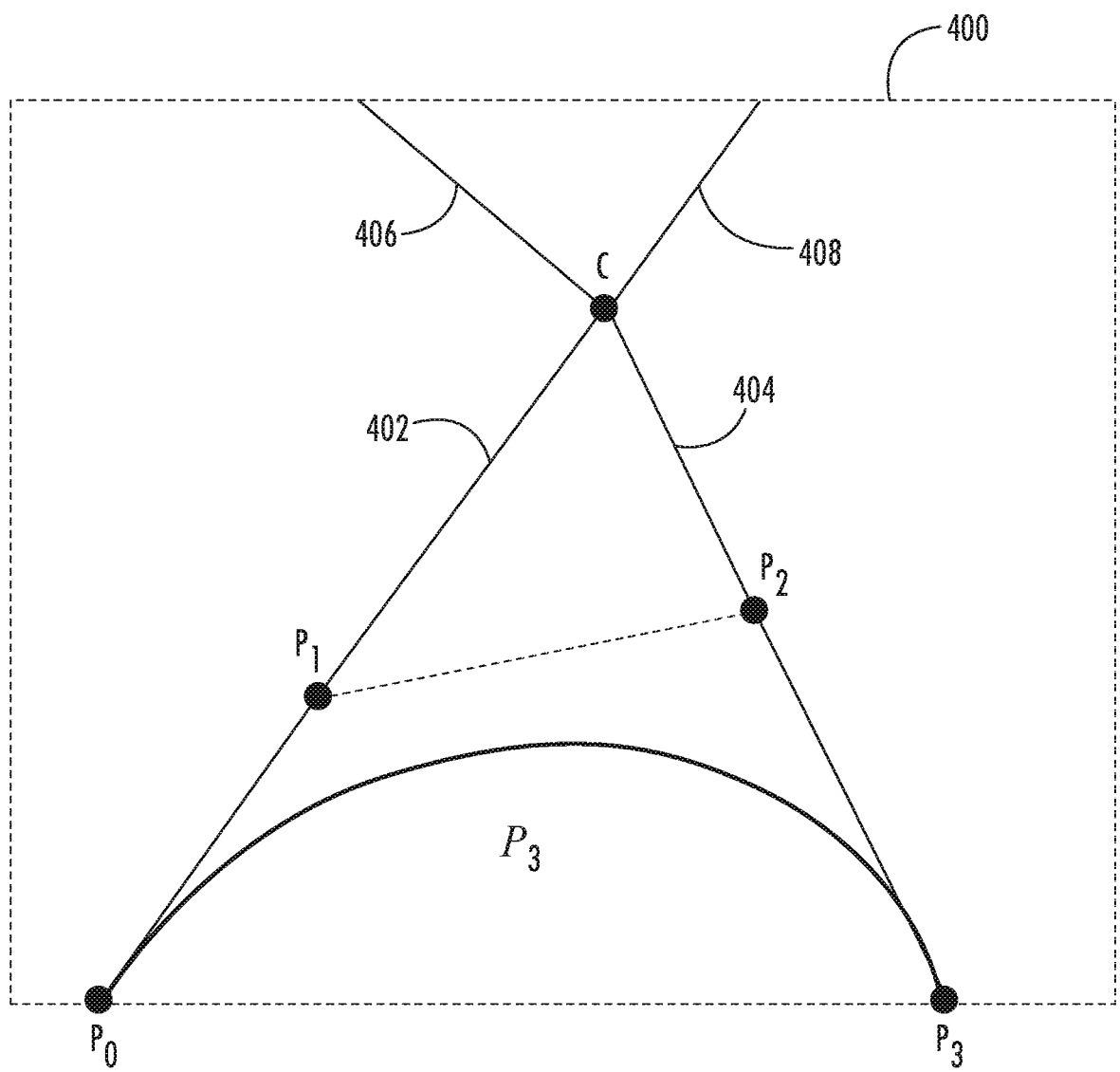
Figure 7:
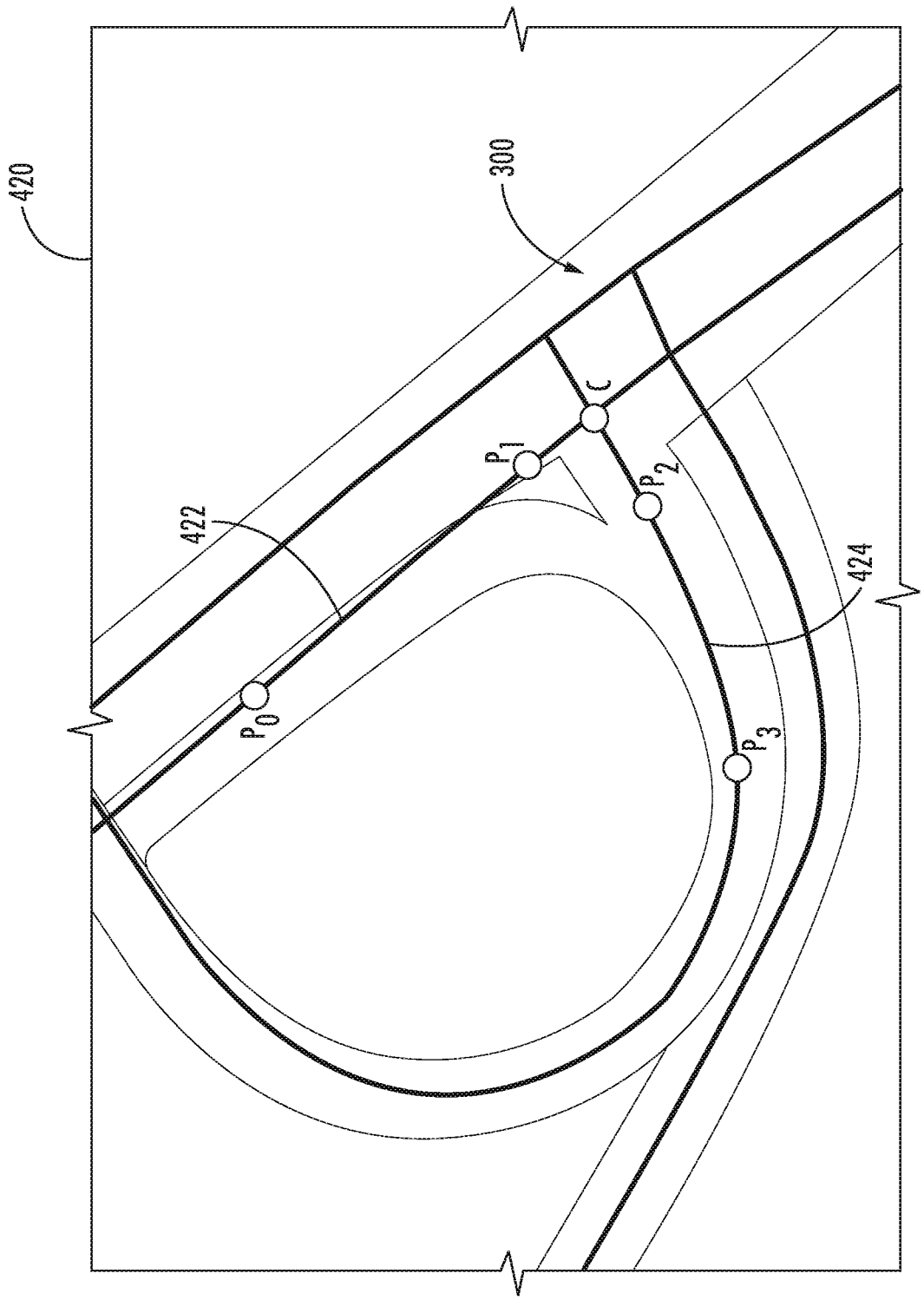
Figure 8:
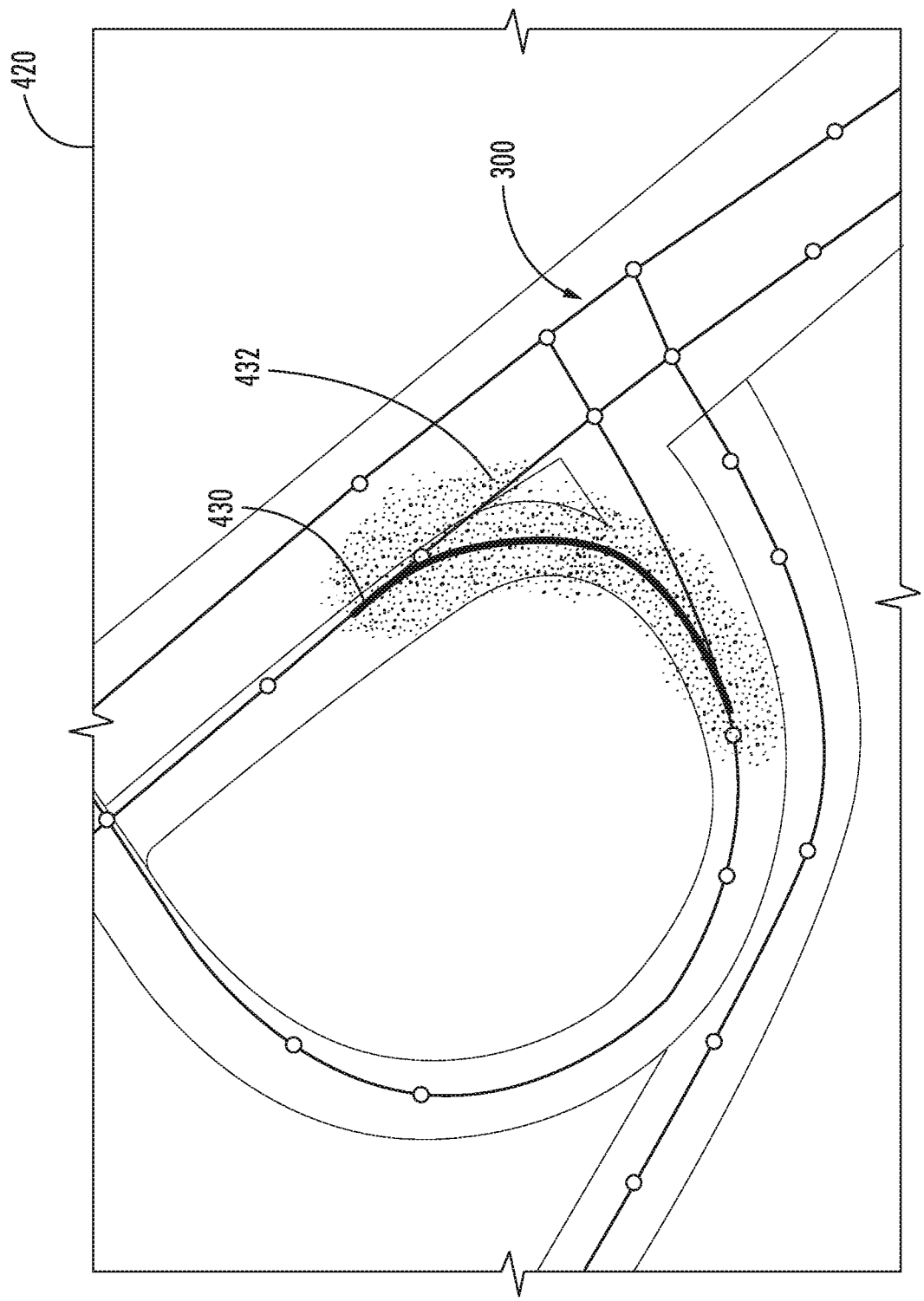
Figure 9:
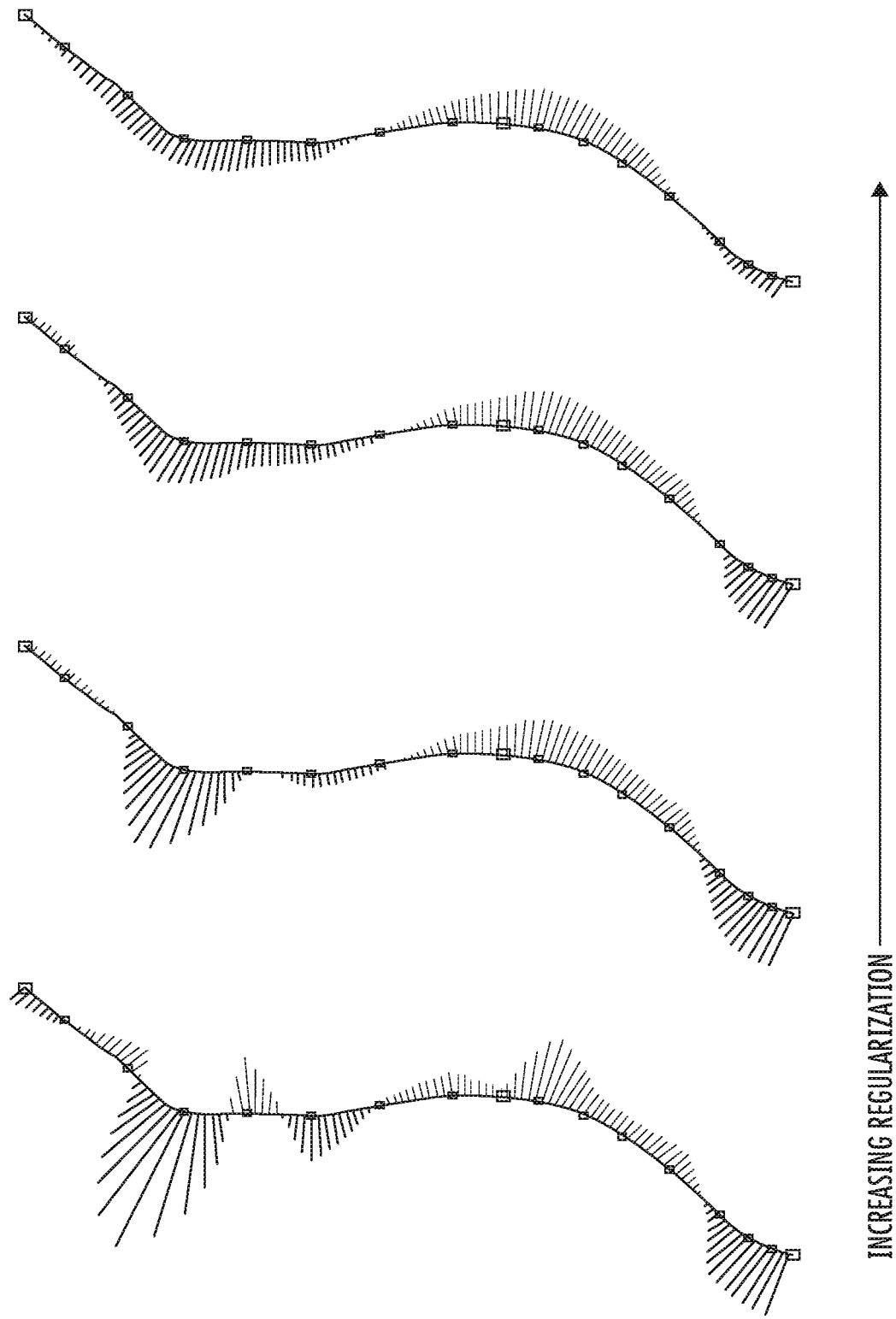
Figure 10:
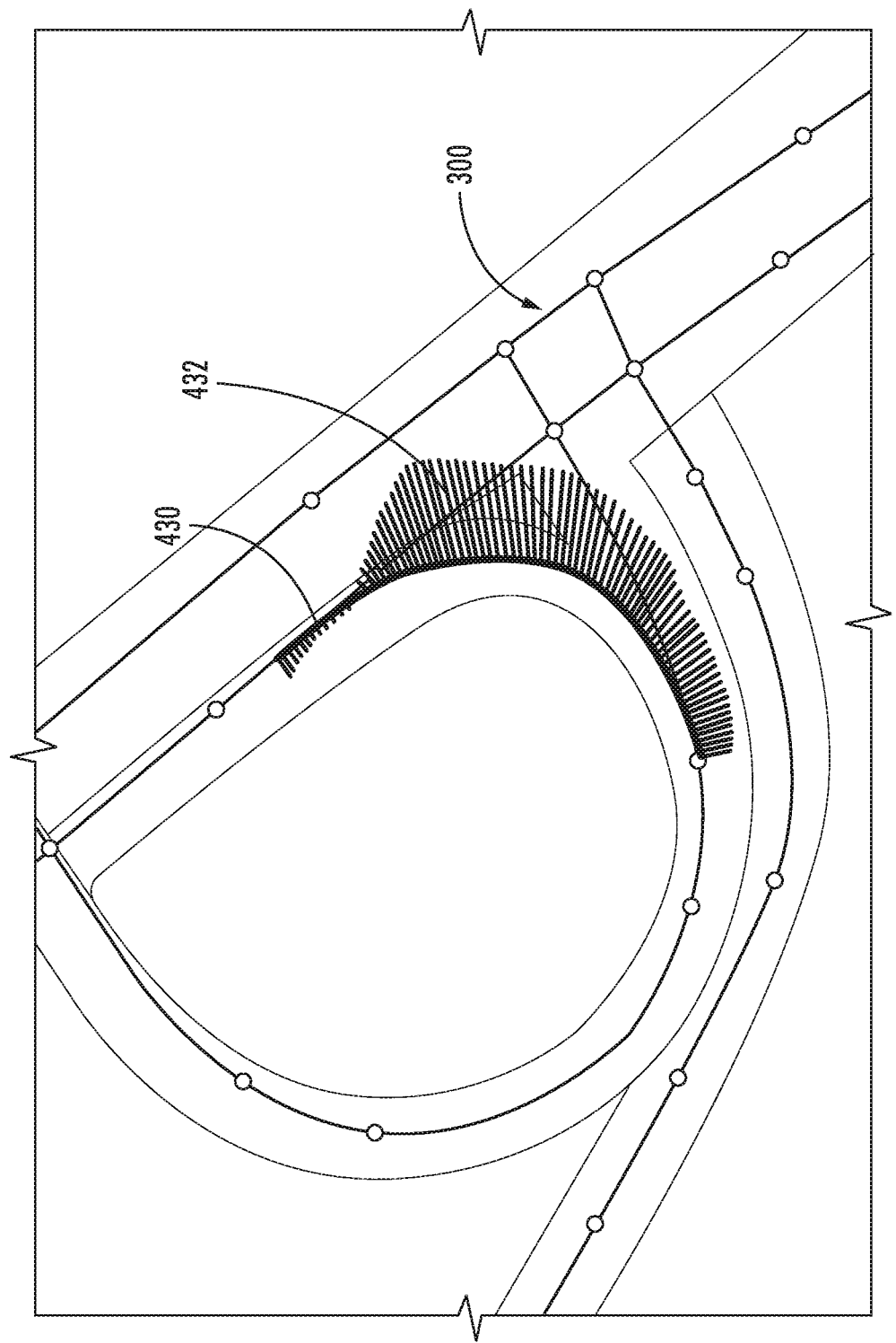
Figure 11:
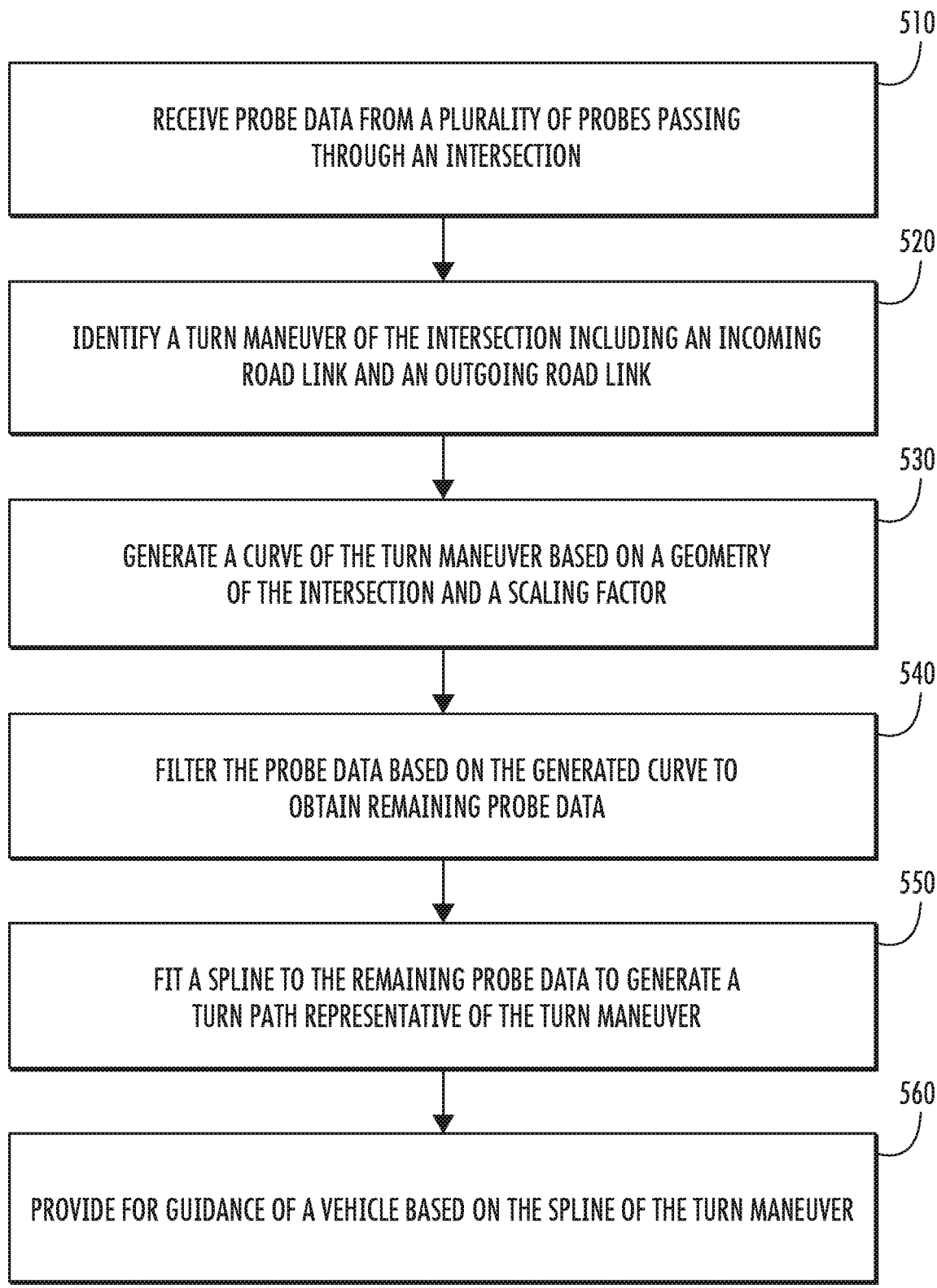

Having thus described example embodiments of the disclosure in general terms, reference will now be made to the accompanying drawings, which are not necessarily drawn to scale, and wherein:

FIG. 1 illustrates a block diagram of a system for creating map intersection turn paths according to an example embodiment of the present disclosure;

FIG. 2 is a block diagram of an apparatus for creating map intersection turn paths according to an example embodiment of the present disclosure;

FIG. 3 is a flowchart of a method for creating map intersection turn paths according to an example embodiment of the present disclosure;

FIG. 4 illustrates a road intersection including probe data within an intersection bounding polygon according to an example embodiment of the present disclosure;

FIG. 5 illustrates a cubic Bézier curve and control polygon according to an example embodiment of the present disclosure;

FIG. 6 illustrates the cubic Bézier curve and control polygon of FIG. 5 as generated based on the geometry of an intersection according to an example embodiment of the present disclosure;

FIG. 7 illustrates the intersection of FIG. 4 including vertices of a control polygon for a cubic Bézier curve according to an example embodiment of the present disclosure;

FIG. 8 illustrates the intersection of FIG. 7 with the map-matched probe data corresponding to the cubic Bézier curve according to an example embodiment of the present disclosure;

FIG. 9 depicts a regularization function employing an increasing regularization factor as applied to a spline according to an example embodiment of the present disclosure;

FIG. 10 illustrates a spline fitted to the intersection of FIG. 4 based on the probe points map-matched to the cubic Bézier curve of FIG. 7 and smoothed according to a regularization function according to an example embodiment of the present disclosure; and FIG. 11 is a flowchart of a method for creating map intersection turn paths according to an example embodiment of the present disclosure.

DETAILED DESCRIPTION

Example embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

A system, method, apparatus, and computer program product are provided herein in accordance with an example embodiment for creating map intersection turn paths, and more particularly, to automatically create two- or three-dimensional intersection turn path spline curves from probe data sources. FIG. 1 illustrates a communication diagram of an example embodiment of a system for implementing example embodiments described herein. The illustrated embodiment of FIG. 1 includes a map services provider system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and a network of a system operator. The processing server 102 may include the map database 108, such as provided by a remote map server. The network may be wired, wireless, or any combination of wired and wireless communication networks, such as cellular, Wi-Fi, internet, local area networks, or the like.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn paths there through.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map services provider 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems including in conjunction with autonomous and semi-autonomous navigation systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by user equipment 104, for example. The navigation-related functions can correspond to vehicle navigation, pedestrian navigation, or other types of navigation. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In certain embodiments, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. While probe data is described herein as being vehicle probe data, example embodiments may be implemented with pedestrian probe data, marine vehicle probe data, or non-motorized vehicle probe data (e.g., from bicycles, skateboards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present disclosure for revising map geometry based on a detailed analysis of probe data and existing map geometry. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

An operation of an example apparatus will herein be described with reference to the flow chart of FIG. 3. The illustrated method may be performed, for example, by apparatus 200 using processor 202 with program code instructions stored in memory 204 to cause the apparatus to perform the operations of the method of FIG. 3. As shown, the apparatus creates a representation of road geometry from probe data at 210. The probe data may include at least an indication of a position and/or a heading of one of a plurality of mobile objects, such as vehicles traversing the intersection. The indication of a position and a heading may be based on signals and/or sensor data captured at the mobile object and/or at a device moving along with the mobile object, such as a mobile device or smart phone. The heading of a mobile object includes the direction of movement of the object, such as a movement of the object along a road. While probe data may include the heading of a mobile device or vehicle, the probe data may simply include a position and a timestamp. Using a sequence of positions arranged by timestamp, a heading can be derived to provide an indication of the trajectory of the mobile device or vehicle. The content of such a data set is also referred to herein as probe data.

As shown at operation 212 of FIG. 3, the apparatus detects an intersection in the representation of the road geometry. The intersection may be a junction of any number of road segments within a limited area, and may be identified based on probe data patterns or based on road geometry which may include an intersection bounding polygon defining the intersection. The apparatus may define at least one curve, such as a Bézier curve representing a trajectory between an entry to and an exit from the intersection as shown at 214. This process is described in greater detail below.

Probe data representative of vehicle trajectories may be map-matched to the curve to define vehicles following a particular turn maneuver through the intersection as shown at 216. A spline may be generated from the map-matched probe data at 218, and the apparatus of the example embodiment may replace part of the created representation of the road geometry for the intersection using the at least one defined B-spline curve, or use the B-spline curve for turn maneuvers through the intersection as shown at 220.

Creating turn paths for intersections is useful for autonomous and semi-autonomous driving controls and other Advanced Driving Assistance Systems (ADAS). Example embodiments of the present disclosure provide that intersections, which may be detected in a representation of road geometry, are modeled by means of B-splines. A respective B-spline may be created between pairs of entries and exits from the intersection. Embodiments disclosed herein use probe data (e.g., crowd sourced location data) to fit a B-spline to probes corresponding to a respective turn maneuver. In order to filter out probes not belonging to a specific turn maneuver, embodiments use a filtering technique by first approximating the turn maneuver by using a Bézier curve rather than relying on underlying shape point geometry. The resulting filtered probe points are then spline fitted with a B-spline using calculus of variations, minimizing the change of curvature, to yield a smooth spline. The turn maneuver for a specific turn of an intersection can then be computed from the resultant B-spline. The published turn path curvature value can be derived in various ways from the spline, such as at the intersection node projection location or the largest curvature value for the turn path can be located along the spline. The B-spline itself or another representation, such as a sequence of one or more Bézier curves, can be published in an ADAS product, such as in a road link database or map database 108 of map services provider 116. The spline can also be used to provide turn path curvature values for individual turn lanes.

Certain embodiments of the present disclosure therefore provide that intersections, which may be detected in a representation of a road geometry, are modeled by means of B-splines. A respective B-spline may be created between pairs of entries to and exits from the intersection. Once created, the B-splines for each intersection may replace the original representation of the intersection in the representation of the road geometry entirely or in part.

Embodiments provided herein may enable the creation of realistic turn path geometries even when the density of indicated positions is sparse and probe data is noisy. Certain embodiments may allow for the repair of defects, such as gaps, incorrect connections, or poor geometry shape in the original road geometry determined from probes. Embodiments may provide a refined representation of an intersection road geometry created automatically. Embodiments may be applicable to the creation of two-dimensional (2D) and three-dimensional (3D) map intersection road geometry.

According to an example embodiment, probe data for each intersection is determined using a bounding polygon (e.g., a rectangle) around the intersection. The probe data may then be initially filtered to remove slow-moving probes (e.g., under five miles per hour) and probes with noisy or erroneous headings or other anomalies.

FIG. 4 illustrates an intersection 300 with probe data 302 and the map intersection geometry paths 306 with nodes 304. Map-matching probe data includes associating probe data with road segments based on a particular map-matching technique. Using map-matching to filter probes belonging to each turn maneuver does not accurately describe a turn path as the link geometry approximates the intersection by 90-degree angles, whereas vehicles may use a curved turn lane such as turn lane 310. The turn lane 310 is not represented by the intersection geometry links 306 or nodes 304. Embodiments described herein solve this problem through a novel process of turn path estimation and formation of a natural turn path based on an analysis of probe data through the turn maneuver. The turn maneuver describes the road geometry for a particular turn comprising road segments through an intersection. The turn path is used herein to describe the actual path taken by a vehicle that travels through the turn maneuver. While the turn maneuver of an intersection may be represented by a sharp turn (e.g., the 90 degree turn of FIG. 4), the actual turn path followed by a vehicle is substantially different.

In an example embodiment, an approximation of the road geometry may be generated using a cubic Bézier curve as the basis. The cubic Bézier curve may be defined by means of a cubic control polygon. Using a cubic Bézier curve may have the effect that a large variety of smooth forms may be achieved for approximating a turn maneuver. In an example embodiment a Bézier curve is defined by means of a cubic control polygon having a first edge, a second edge, a third edge and a fourth edge. The first edge extends between an intersection entry gate and an intersection exit gate. The second edge has a start point at the intersection entry gate and extends to an end point with an orientation corresponding to a direction of travel of a curve entering the intersection at the intersection entry gate. The fourth edge has an end point at the intersection exit gate and reaches the end point from a start point with an orientation corresponding to a direction of travel of a curve exiting the intersection at the intersection exit gate. A length of the second edge and a length of the fourth edge are scaled with a length of the first edge and a (fixed or adjustable) scaling factor described further below. The third edge extends between the end point of the second edge and the start point of the fourth edge. Taking account of the orientation of curves entering the intersection and leaving the intersection may have the effect that the connections between entry and exit gates may be modeled in a particularly faithful manner.

Embodiments described herein create a cubic Bézier curve that approximates the turn maneuver. A cubic Bézier curve is defined by a control polygon $[P_0, P_1, P_2, P_3]$ where edges $[P_0, P_1]$ and $[P_2, P_3]$ are the tangent to the curve ends. The curve end tangent vectors are controlled by the control polygon lines $P_0, P_1$ and $P_2, P_3$. The cubic Bézier curve can be represented as:

$$B(t) = \sum_{i=0}^{3} P_i b_{i,n}(t) = (1-t)^3 P_0 + 3(1-t)^2 t P_1 + 3(1-t)t^2 P_2 + t^3 P_3,$$

$$t \in [0, 1]$$

Where the Bézier curve control polygon is illustrated in FIG. 5, depicting the control polygon points $[P_0, P_1, P_2, P_3]$.

The Bézier curve is defined by placing the vertices $[P_0, P_1, P_2, P_3]$ of the control polygon on or near the link geometry such that the curve approximates the turn maneuver. This is accomplished by placing the control polygon vertices $[P_0, P_1]$ on the incoming intersection link and polygon vertices $[P_2, P_3]$ on the outgoing intersection link. Accordingly, $P_0$ is placed on the incoming intersection link near the intersection bounding polygon/rectangle or the "entry gate" and $P_3$ is placed at the outgoing intersection link near bounding polygon/rectangle or the "exit gate".

FIG. 6 illustrates an example embodiment including an intersection bounding polygon 400 (in this case, a rectangle), that encompasses the intersection of road links or segments 402, 404, 406, and 408. In the illustrated embodiment, a vehicle is turning from link 402 to link 404. The control polygon vertex $P_0$ is placed on the incoming intersection link 402 near the bounding polygon border at the entry gate, while vertex $P_3$ is placed on the outgoing intersection link 404 near the bounding polygon border at the exit gate.

To establish the Bézier end tangent direction and magnitudes, an approximate intersection center vertex C is placed near the intersection center such that Bézier tangent vectors $[\overrightarrow{P_0,C}]$ and $[\overrightarrow{C,P_3}]$ are obtained to approximate the direction of the link geometry at $P_0$ and $P_3$ respectively. The exact placement of the intersection center vertex C is not crucial since the Bézier curve is only approximating the turn maneuver in order to filter probe data subject to the map matching filter distance and heading threshold. FIG. 7 illustrates an example embodiment using the same control polygon vertices overlaid on a map 420 of the intersection 300 of FIG. 4 with incoming link 422 and outgoing link 424. The Bézier control polygon vertices $P_1, P_2$ will be placed along the lines $P_0, C$ and $C, P_3$ respectively using scaling factor γ such that $P_1 = P_0 + \gamma(C - P_0)$ and $P_2 = P_3 - \gamma(C - P_3)$. The larger the scaling factor γ, the closer the Bézier curve moves towards the intersection center C. The choice of the scaling factory γ is not highly sensitive, but can be modified based on the estimated size of the intersection. A typical value of γ that works well may range from 0.65 to 0.90. A scaling factor of 1.0 would result in a substantially 90-degree turn.

Probe data is then filtered using the placement and shape of the Bézier curve to map match the probes to the Bézier to filter out those probes not belonging to the turn maneuver. Due to relaxed map matching tolerances (e.g., 25 meter distance threshold and 15° heading threshold), the exact position and shape of the Bézier curve is not crucial as it remains superior to the 90° link geometry turn maneuver shape. FIG. 8 illustrates the remaining retained turn maneuver probe data points 432 from the probe data points 302 of FIG. 4. The probe data not retained is discarded for purposes of calculating the B-spline turn maneuver described herein.

A spline 430 is fit to the remaining filtered probe data. To do so, a knot vector for the B-spline curve fit is created where the parametric distance between each knot is inversely proportional to the curvature of the Bézier curve. This can be accomplished using Douglas-Peucker line approximation to the Bézier curve. The parametric knot vector value range is typically parameterized from $t_0 = 0.0$ at the beginning of the B-spline to $t_m = 1.0$ at the end of the B-spline. A parametric B-spline $u_i$ value is assigned to each turn maneuver probe point $p_i$ based on the projected arc-length location along the Bézier curve. Each turn maneuver point is perpendicularly projected onto the Bézier curve. The arc length position of each projected probe point is normalized by the total arc length of the Bézier curve. This yields a parameterized probe point range from $u = 0.0$ at the beginning of the B-spline to $u = 1.0$ at the end of the B-spline.

The B-spline is then fitted to the probe points by minimizing the following function:

$$\mathfrak{I} = \mathrm{MIN}\left\{\sum_{i=0}^{n}(p_i - f(u_i))^2 + v_j \int_{\Omega}\left|\frac{\partial k}{\partial s}\right|^2 ds\right\}$$

This regularization function reduces or minimizes the change of curvature using regularization to keep the curvature of the spline as smooth as possible while still staying consistent (e.g., close to) the constraints (e.g., the probe points $p_i$ of the turn maneuver. The regularization factor $v_j$ controls the tradeoff between the least squares term and the smoothness term. Generally, the value for the regularization factor is based, at least in part, on the classification of the road (e.g., highway, two-lane urban road, one-lane road, etc.) The regularization factor $v_j$ is assigned to each knot interval of the spline. Increasing the regularization factor v increases the curve smoothness, as illustrated in FIG. 9, where a progression is shown from left to right of increasing regularization. Additionally, positional and directional end point constraints may be imposed on the spline fit such that the ends of the B-spline coincides with the existing link geometry to ensure continuity in position and heading while transitioning from the link geometry onto the beginning of the B-spline and when exiting the end of the B-spline transitioning onto the link geometry. FIG. 10 illustrates the resulting B-spline 440 with curvature porcupines 442 for the intersection 300 of FIG. 4. The resulting fitted B-spline 440 is a smooth analytical representation of a turn path corresponding to the turn maneuver and can be used in ADAS application as-is, converted to other representations (e.g., Bézier curve(s)), or curvature value(s) can be evaluated for the spline and provided in an ADAS product.

FIGS. 3 and 11 illustrate flowcharts depicting methods according to example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present disclosure and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 11 illustrates a flowchart of a method according to an example embodiment of the present disclosure for generating turn paths for an intersection. As shown at 510, probe data may be received from a plurality of probes passing through an intersection. An intersection may be established based on a probe data pattern or established in map data based on a bounding polygon or rectangle for an intersection. A turn maneuver of the intersection is identified at 520 including an incoming road link and an outgoing road link. The incoming road link may be established where a probe crosses the bounding polygon at an entry point to the intersection, while the outgoing road link may be where the probe crosses the bounding polygon at an exit point to the intersection. A curve of the turn maneuver may be generated at 530 based on a geometry of the intersection and a scaling factor. The curve may be a Bézier curve generated using a control polygon formed based on the geometry of the intersection and the scaling factor. The probe data may then be filtered at 540 based on the generated curve to obtain remaining probe data that is representative of the turn maneuver. At 550, a spline is fit to the remaining probe data to generate a turn path representative of the turn maneuver. Once the spline is generated, it may be used to provide guidance of a vehicle based on the spline of the turn path at 560. Providing guidance may include providing for autonomous control of a vehicle through a turn path of the intersection, for example.

In an example embodiment, an apparatus for performing the methods of FIG. 3 or 11 above may include a processor (e.g., the processor 202) configured to perform some or each of the operations (210-220 or 510-560) described above. The processor may, for example, be configured to perform the operations (210-220 or 510-560) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 210-220 or 510-560 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus comprising at least one processor and at least one memory including computer program code, the at least one memory and computer program code configured to, with the processor, cause the apparatus to at least:
   receive probe data from a plurality of probes passing through an intersection;
   identify a turn maneuver of the intersection including an incoming road link and an outgoing road link;
   generate a curve of the turn maneuver based on a geometry of the intersection and a scaling factor;
   filter the probe data by map-matching the probe data to the generated curve with at least one predetermined tolerance based on a placement and shape of the curve to obtain remaining probe data, wherein the map-matched probe data is the remaining probe data;
   fit a spline to the remaining probe data to generate a turn path representative of the turn maneuver; and
   provide for guidance of a vehicle based on the spline of the turn path.

2. The apparatus of claim 1, wherein the curve comprises a cubic Bézier curve, wherein causing the apparatus to generate a cubic Bézier curve of the turn maneuver based on a geometry of the intersection and a scaling factor comprises causing the apparatus to:
   establish a first vertex of a control polygon of the cubic Bézier curve at a point along the incoming road link;
   establish a second vertex of the control polygon of the cubic Bézier curve at a point along the outgoing road link;

identify an approximate intersection center;
establish a third vertex of the control polygon of the cubic Bézier curve at a point along a vector from the first vertex to the approximate intersection center based on the scaling factor; and
establish a fourth vertex of the control polygon of the cubic Bézier curve at a point along a vector from the second vertex to the approximate intersection center based on the scaling factor.

3. The apparatus of claim 1, wherein causing the apparatus to provide for guidance of the vehicle based on the spline of the turn path comprises causing the apparatus to:
provide autonomous vehicle control through the intersection following the spline of the turn path.

4. The apparatus of claim 1, wherein causing the apparatus to fit a spline to the remaining probe data to generate the turn path representative of the turn maneuver comprises causing the apparatus to:
create a knot vector for the spline wherein a parametric distance between each knot is inversely proportional to a curvature of the curve.

5. The apparatus of claim 4, wherein causing the apparatus to fit a spline to the remaining probe data to generate the turn path representative of the turn maneuver further comprises causing the apparatus to:
assign a parametric B-spline value to each point of remaining probe data based on a projected arc-length location along the curve, wherein each point of remaining probe data is projected onto the curve.

6. The apparatus of claim 5, wherein causing the apparatus to fit a spline to the remaining probe data to generate the turn path representative of the turn maneuver further comprises causing the apparatus to:
reduce a change of curvature using a regularization function to smooth a curvature of the spline with a regularization factor.

7. The apparatus of claim 1, wherein the at least one predetermined tolerance is a non-zero meter distance threshold, a non-zero degree heading threshold, or a combination thereof.

8. A computer program product comprising at least one non-transitory computer-readable storage medium having computer-executable program code instructions stored therein, the computer-executable program code instructions comprising program code instructions to:
receive probe data from a plurality of probes passing through an intersection;
identify a turn maneuver of the intersection including an incoming road link and an outgoing road link;
generate a curve of the turn maneuver based on a geometry of the intersection and a scaling factor;
filter the probe data by map-matching the probe data to the generated curve with at least one predetermined tolerance based on a placement and shape of the curve to obtain remaining probe data, wherein the map-matched probe data is the remaining probe data;
fit a spline to the remaining probe data to generate a turn path representative of the turn maneuver; and
provide for guidance of a vehicle based on the spline of the turn path.

9. The computer program product of claim 8, wherein the curve comprises a cubic Bézier curve, wherein the program code instructions to generate a cubic Bézier curve of the turn maneuver based on a geometry of the intersection and a scaling factor comprise program code instructions to:
establish a first vertex of a control polygon of the cubic Bézier curve at a point along the incoming road link;
establish a second vertex of the control polygon of the cubic Bézier curve at a point along the outgoing road link;
identify an approximate intersection center;
establish a third vertex of the control polygon of the cubic Bézier curve at a point along a vector from the first vertex to the approximate intersection center based on the scaling factor; and
establish a fourth vertex of the control polygon of the cubic Bézier curve at a point along a vector from the second vertex to the approximate intersection center based on the scaling factor.

10. The computer program product of claim 8, wherein program code instructions to provide for guidance of the vehicle based on the spline of the turn path comprise program code instructions to:
provide autonomous vehicle control through the intersection following the spline of the turn path.

11. The computer program product of claim 8, wherein the program code instructions to fit a spline to the remaining probe data to generate the turn path representative of the turn maneuver comprise program code instructions to:
create a knot vector for the spline wherein a parametric distance between each knot is inversely proportional to a curvature of the curve.

12. The computer program product of claim 11, wherein the program code instructions to fit a spline to the remaining probe data to generate the turn path representative of the turn maneuver further comprise program code instructions to:
assign a parametric B-spline value to each point of remaining probe data based on a projected arc-length location along the curve, wherein each point of remaining probe data is projected onto the curve.

13. The computer program product of claim 12, wherein the program code instructions to fit a spline to the remaining probe data to generate the turn path representative of the turn maneuver further comprise program code instructions to:
reduce a change of curvature using a regularization function to smooth a curvature of the spline with a regularization factor.

14. A method comprising:
receiving probe data from a plurality of probes passing through an intersection;
identifying a turn maneuver of the intersection including an incoming road link and an outgoing road link;
generating a curve of the turn maneuver based on a geometry of the intersection and a scaling factor;
filtering the probe data by map-matching the probe data to the generated curve with at least one predetermined tolerance based on a placement and shape of the curve to obtain remaining probe data, wherein the map-matched probe data is the remaining probe data;
fitting a spline to the remaining probe data to generate a turn path representative of the turn maneuver; and
providing for guidance of a vehicle based on the spline of the turn path.

15. The method of claim 14, wherein the curve comprises a cubic Bézier curve, wherein generating a cubic Bézier curve of the turn maneuver based on a geometry of the intersection and a scaling factor comprises:
establishing a first vertex of a control polygon of the cubic Bézier curve at a point along the incoming road link;
establishing a second vertex of the control polygon of the cubic Bézier curve at a point along the outgoing road link;
identifying an approximate intersection center;

establishing a third vertex of the control polygon of the cubic Bézier curve at a point along a vector from the first vertex to the approximate intersection center based on the scaling factor; and establishing a fourth vertex of the control polygon of the cubic Bézier curve at a point along a vector from the second vertex to the approximate intersection center based on the scaling factor.

16. The method of claim 14, wherein providing for guidance of the vehicle based on the spline of the turn path comprises:

providing autonomous vehicle control through the intersection following the spline of the turn path.

17. The method of claim 14, wherein fitting a spline to the remaining probe data to generate the turn path representative of the turn maneuver comprises:

creating a knot vector for the spline wherein a parametric distance between each knot is inversely proportional to a curvature of the curve.

18. The method of claim 17, wherein fitting a spline to the remaining probe data to generate the turn path representative of the turn maneuver further comprises:

assigning a parametric B-spline value to each point of remaining probe data based on a projected arc-length location along the curve, wherein each point of remaining probe data is projected onto the curve.

* * * * *